United States Patent
Kamada et al.

(10) Patent No.: US 7,749,128 B2
(45) Date of Patent: **\*Jul. 6, 2010**

(54) AUTOMATIC TRANSMISSION FOR AUTOMOTIVE VEHICLES

(75) Inventors: Shinya Kamada, Kure (JP); Takamichi Teraoka, Hiroshima (JP); Junichi Doi, Hiroshima (JP); Tokimori Saka, Hiroshima (JP); Tatsuhiko Iwasaki, Hiroshima (JP); Naohiro Sakaue, Hiroshima (JP); Tatsutoshi Mizobe, Hiroshima (JP); Yoshihiko Fujita, Aki-gun (JP); Norio Iwashita, Higashihiroshima (JP); Satoshi Komori, Hiroshima (JP); Kazuhiko Ueda, Hatsukaichi (JP); Seiji Esaki, Hiroshima (JP)

(73) Assignee: Mazda Motor Corporation, Hiroshima (JP)

(\*) Notice: Subject to any disclaimer, the term of this patent is extended or adjusted under 35 U.S.C. 154(b) by 661 days.

This patent is subject to a terminal disclaimer.

(21) Appl. No.: 11/555,369

(22) Filed: Nov. 1, 2006

(65) Prior Publication Data

US 2007/0099742 A1 May 3, 2007

(30) Foreign Application Priority Data

Nov. 2, 2005 (JP) .............................. 2005-320060

(51) Int. Cl.
*F16H 3/44* (2006.01)
*F16H 37/06* (2006.01)

(52) U.S. Cl. ................. 475/280; 475/281; 475/282; 475/284; 475/286; 475/311; 475/317; 475/323; 475/330

(58) Field of Classification Search ......... 475/280–292, 475/296, 297, 311, 312, 317, 318, 323, 324
See application file for complete search history.

(56) References Cited

U.S. PATENT DOCUMENTS

| 5,106,352 | A | | 4/1992 | Lepelletier | |
|---|---|---|---|---|---|
| 5,954,613 | A | * | 9/1999 | Park | 475/275 |
| 6,039,670 | A | * | 3/2000 | Park | 475/275 |

(Continued)

FOREIGN PATENT DOCUMENTS

DE        101 62 888 A1    7/2003

OTHER PUBLICATIONS

European Search Report for EP Application 06022858.2, Mar. 12, 2007.

*Primary Examiner*—Tisha D Lewis
(74) *Attorney, Agent, or Firm*—Alleman Hall McCoy Russell & Tuttle LLP

(57) ABSTRACT

There is provided an automatic transmission comprising a first shaft capable of receiving torque from an engine, and four planetary gear sets arranged coaxially on the first shaft and in series in an axial direction of the first shaft. Each of the four planetary gear sets has a single sun gear and a single ring gear. Further, the automatic transmission comprises an output wheel arranged coaxially on the first shaft, and capable of outputting torque transmitted from the engine through some of the four planetary gear sets. The output wheel is arranged between two of the four planetary gear sets. Accordingly, the noise or vibration from the planetary gear sets in the automatic transmission may be reduced, while the overall length of the first shaft may be made shorter, and the overall size of the automatic transmission may be made smaller.

18 Claims, 5 Drawing Sheets

U.S. PATENT DOCUMENTS

| | | |
|---|---|---|
| 6,120,410 A | 9/2000 | Taniguchi et al. |
| 6,342,026 B1 | 1/2002 | Takagi et al. |
| 6,884,197 B2 | 4/2005 | Ishimaru et al. |
| 6,905,434 B2 | 6/2005 | Sugihara et al. |
| 7,189,180 B2 * | 3/2007 | Park .......................... 475/277 |
| 7,291,086 B2 * | 11/2007 | Park .......................... 475/284 |
| 7,377,874 B2 * | 5/2008 | Hayabuchi et al. .......... 475/289 |
| 2004/0048716 A1 | 3/2004 | Ziemer |

* cited by examiner

|  | 1 | 2 | 3 | 4 | 5 | 6 | R |
|---|---|---|---|---|---|---|---|
| Low Clutch (C1) | X | X | X | X | | | |
| High Clutch (C2) | | | | X | X | X | |
| 3/5/R Clutch (C3) | | | X | | X | | X |
| L/R Brake (B2) | (X) | | | | | | X |
| 2/6 Brake (B1) | | X | | | | X | |

AUTOMATIC TRANSMISSION FOR AUTOMOTIVE VEHICLES

BACKGROUND

The present description relates to an automatic transmission for automotive vehicles, particularly relates to an arrangement of gear-train of an automatic transmission.

There have been proposed various arrangements of a plurality of planetary gear sets to achieve six or more forward speed ratios. As is well known in the art, a planetary gear set consists of three rotational elements that are a sun gear, a ring gear, and a planetary carrier rotationally supporting planetary pinions, each of which engages with both the sun gear and ring gear. When a single planetary gear set is made up with only these three basic rotational elements comprising a single sun gear, a single ring gear and a single carrier, it is so called a single pinion type.

In addition to the single pinion type, there are also proposed various types of composite planetary gear sets for creating more than three rotational elements within a single planetary gear set. One example of the composite planetary gear sets is shown in U.S. Pat. No. 6,884,197, which presents a six-speed automatic transmission comprising three planetary gear sets. One of the three planetary gear sets has two sun gears, a single carrier, and a single ring gear, thereby creating four rotational elements from the one single planetary gear set.

In the '197 patent, all of the three planetary gear sets are arranged coaxially on a single input shaft. Also, an output gear is arranged coaxially on the input shaft. Therefore, a minimum number of shafts are required, so that overall size of the automatic transmission may be reduced advantageously for mounting it on an automotive vehicle, especially when the engine and the transmission are mounted laterally on the vehicle.

However, the composite planetary gear set presented in the '197 patent may have a disadvantage in noise and vibration, because the pinions may be longer for engaging with the two sun gears, and may have more tendency to tilt than the single pinion type.

Further in the '197 patent, the input shaft transmits torque to the single carrier of the planetary gear set having the two sun gears through a clutch and a connecting member arranged between the two sun gears. Because each of the sun gears needs to be connected to a frictional member or a connecting member, the clutch is forced to be located offset from the planetary gear set in the axial direction. That may cause the input shaft longer, and eventually cause the overall size of the automatic transmission greater.

Therefore, there is a need to improve an automatic transmission of the type presented in the prior art in terms of the noise or vibration and the size.

SUMMARY

Accordingly, there is provided, in one aspect of the present description, an automatic transmission comprising a first shaft capable of receiving torque from an engine, and four planetary gear sets arranged coaxially on the first shaft and in series in an axial direction of the first shaft. Each of the four planetary gear sets has a single sun gear and a single ring gear. Further, the automatic transmission comprises an output wheel arranged coaxially on the first shaft, and capable of outputting torque transmitted from the engine through some of the four planetary gear sets. The output wheel is arranged between two of the four planetary gear sets.

By making the each of the four planetary gear sets with the single sun gear and the single ring gear, the pinions may be shorter, and the noise or vibration from the planetary gear sets in the automatic transmission may be reduced.

By arranging the output wheel between two of the four planetary gear sets, frictional elements such as brakes and clutches for selectively engaging rotational elements of the planetary gears may be overlapped with the planetary gears in the axial direction, because connecting members between the rotational elements and the frictional elements may be arranged at both sides of the each planetary gear with single sun and ring gears. Therefore, the overall length of the first shaft may be made shorter, and the overall size of the automatic transmission may be made smaller.

There is provided, in another aspect of the present invention, an automatic transmission comprising an input shaft capable of receiving torque from an engine, a transmission case rotationally supporting the input shaft, and first and second planetary gear sets arranged coaxially on the input shaft. Each of the first and second planetary gear sets has a single sun gear and a single ring gear, one of which permanently rotates together with the first shaft, and the other of which is fixed to the transmission case. The automatic transmission further comprises a third gear mechanism arranged coaxially on the input shaft between the first and second planetary gear set, and capable of receiving torque selectively through the first or second planetary gear set, and an output gear arranged coaxially on the first shaft between the first planetary gear set and the third gear mechanism and capable of outputting torque from the third gear mechanism.

Since each of the first and second planetary gear sets has, for example, the single sun gear permanently fixed to the transmission case and the single ring gear permanently rotating together with the input shaft, the first and second planetary gear sets always reduce speeds of the input shaft. Therefore, torque will be multiplied at the first and second planetary gear sets as a first stage of multiple stages, and torque load there will be minimal. This may result in a smaller radial size of the first and second planetary gear sets. Consequently, frictional element such as clutches and brakes may be overlapped with the planetary gears in the axial direction. Therefore, the overall length of the input shaft may be made shorter, and the overall size of the automatic transmission may be made smaller.

BRIEF DESCRIPTION OF THE DRAWINGS

The advantages described herein will be more fully understood by reading an example of embodiments in which the above aspects are used to advantage, referred to herein as the Detailed Description, with reference to the drawings wherein.

DETAILED DESCRIPTION

Figure 1:
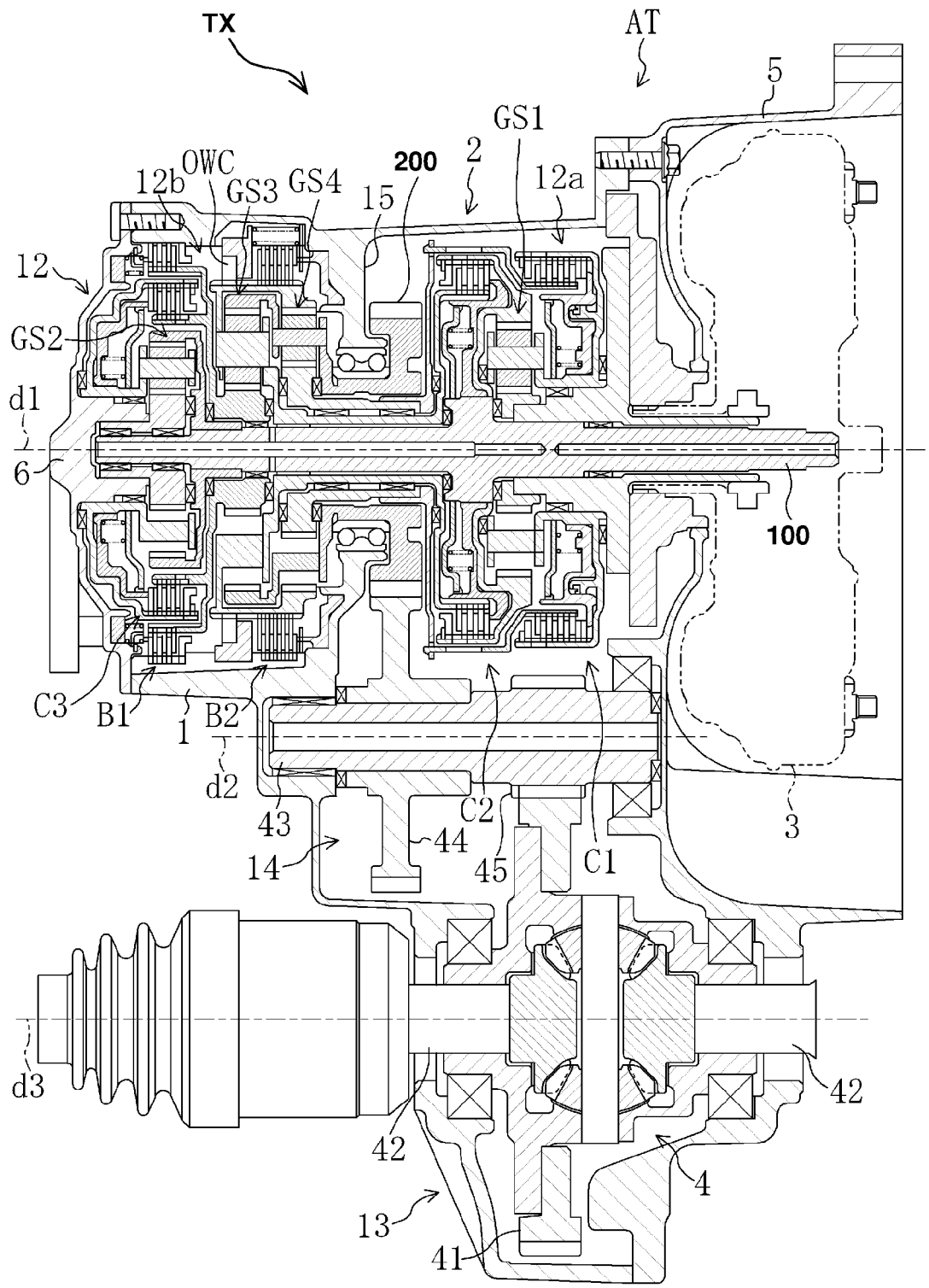
FIG. 1 is a sectional view of transaxle including an automatic transmission for an automotive vehicle in accordance with an embodiment of the present description.

An embodiment of the present description will now be described with reference to the drawings, starting with FIG. 1, which shows an overall construction of a transaxle TX for an automotive vehicle. The transaxle TX is coupled to an engine not shown, and is mounted laterally together with the engine on the vehicle. The transaxle TX basically consists of an automatic transmission AT, and a differential gear mechanism 4. Then, the transaxle TX is coupled to front wheels through drive shafts 42, and transmits torque from the engine to the front wheels.

The automatic transmission AT comprises a shifting gear mechanism 2, and a torque converter 3. The torque converter 3 is coupled to a crank shaft of the engine, as is known in the art. The torque converter 3 receives torque from the engine, converts or multiplies it, and transmits it to an input shaft 100 of the shifting gear mechanism 2. The shifting gear mechanism 2 selectively takes one of speed ratios between the input shaft 100 and an output gear 200. The output gear 200 is rotationally arranged coaxially with the input shaft 100.

The output gear 200 engages with a driven gear 44 arranged coaxially on a counter shaft 43, which is arranged in parallel to the input shaft 100. The driven gear 44 is coupled to the counter shaft 43 through a spline or other coupling known in the art, and rotates together with the counter shaft 43. Torque is transmitted from the output gear 200 to the counter shaft 43 through the driven gear 44 while the speed is reduced. A final gear 45 is also arranged coaxially on and coupled to the counter shaft 43, and rotates together with it. The final gear engages with a ring gear 41 of the differential gear mechanism 4, and also transmits the torque while reducing the speed. The differential gear mechanism 44 transmits the torque from the ring gear 41 to the right and left drive shafts 42 in the well known manner.

The torque converter 3 is housed within a torque converter housing 5. The shifting gear mechanism 2, the differential gear mechanism 4 and the counter shaft 43 are housed within a transmission case 1. The transmission case 1 has, in general, a shifting gear chamber 12 that houses the shifting gear mechanism 2, a differential gear mechanism chamber 13 that houses the differential gear mechanism 4, and a counter shaft chamber 14 that houses the counter shaft arranged between the shifting gear chamber 12 and the differential gear mechanism chamber 13. A front opening of the shifting gear chamber 12 is covered by the torque converter housing 5, and a rear opening is covered by a rear cover 6.

Figure 2:
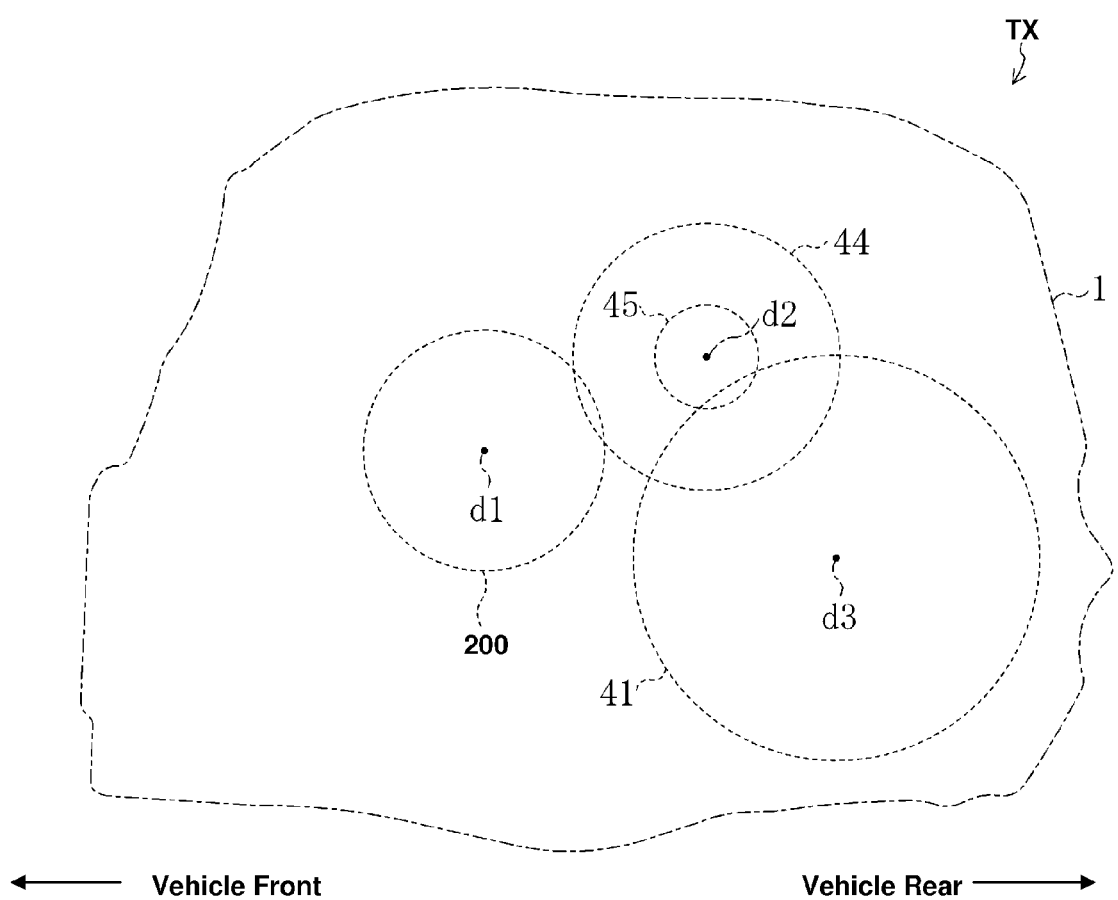
FIG. 2 is a side explanatory diagram of the transaxle of the embodiment.

A positional relationship between the three shafts, the input shaft 100, the counter shaft 43 and the drive shafts 42, will now be described with reference to FIG. 2, which shows axis centers d1, d2 and d3 of the input shaft 100, the counter shaft 43 and the drive shafts 42. Also FIG. 2 shows, by broken lines, the output shaft 200 that is coaxial with the input shaft 100, the driven gear 44 and final gear 45 that are coaxial with the counter shaft 43, and the ring gear 41 that is coaxial with the drive shafts 42.

The three axes d1, d2 and d3 are arranged horizontally in the order of the input shaft 200, the counter axis 43 and the drive shaft 42. The axis d2 of the counter shaft 43 is positioned highest among the three axes, and the axis d3 of the drive shaft 42 is lowest. However, the relative, positional relationship between the input shaft 200, the counter shaft 43 and the drive shaft 42 may vary in dependence on a geometric relationship of gears constituting the shifting gear mechanism 2, gears constituting the differential gear mechanism 4, the driven gear 44 and the final gear 45, packaging requirement for the transaxle in an engine room of the automotive vehicle, or the like.

Figure 3:
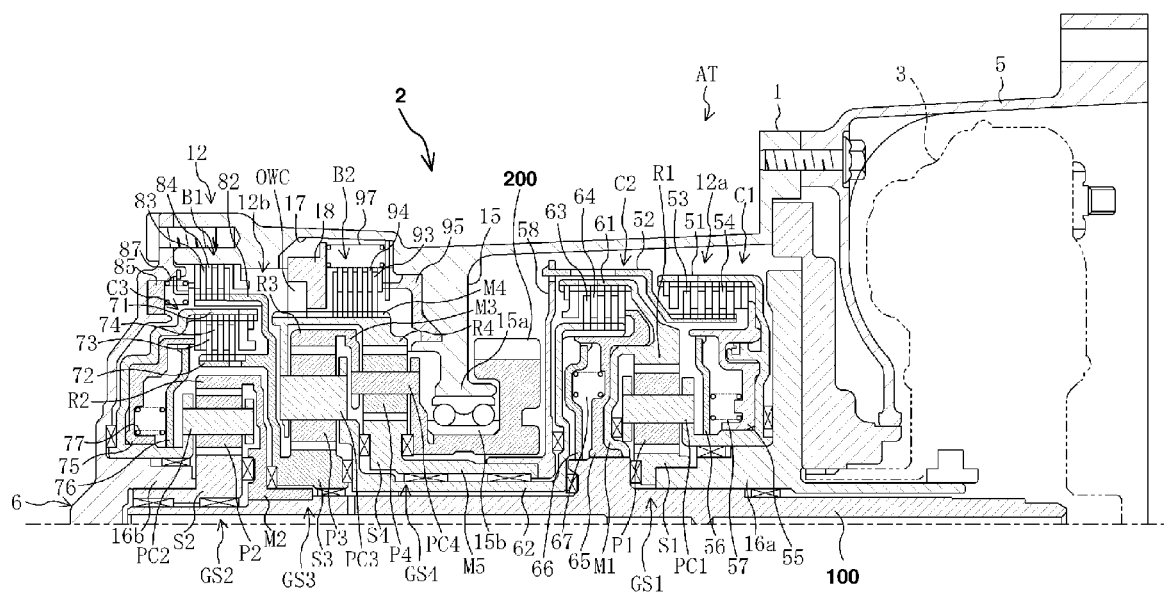
FIG. 3 is a sectional view of the automatic transmission of the embodiment.

The shifting gear mechanism 2 will now be described with reference to FIGS. 1, 3 and 4. FIG. 3 shows a detailed sectional view of the shifting gear mechanism 2 in the automatic transmission AT. And, FIG. 4 schematically shows rotational elements and frictional elements of the shifting gear mechanism 2.

Figure 4:
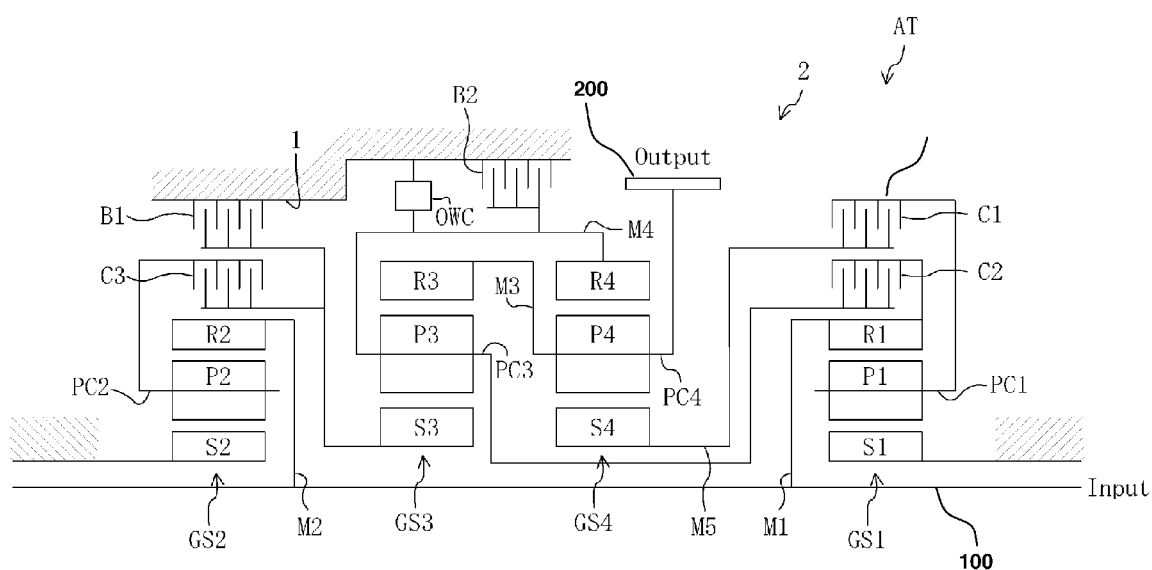
FIG. 4 is a skeleton diagram schematically showing rotational elements and frictional elements of the automatic transmission of the embodiment.

As shown in FIG. 4, the shifting gear mechanism 2 comprises first through four planetary gear sets GS1, GS2, GS3 and GS4, first through three wet multi-plate clutches C1, C2 and C3, and first and second wet multi-plate brakes B1 and B2, all of which are coaxial with the input shaft 100. The first and second planetary gear sets GS1 and GS2 are respectively smaller in outer diameter than the third and fourth planetary gear sets GS3 and GS4, because the planetary gear sets GS1 and GS2 reduce speed of the input shaft 100 directly and have less torque loads than the other two, as described in greater detail below.

As shown in FIG. 1, the transmission case 1 rotationally supports the input shaft 100 by using first and second bosses 16a and 16b at the both axial ends of the shifting gear chamber 12 of the transmission case 1, through bearings and other member if any, in the manner known in the art. Also generally in the middle of the shifting gear chamber 12 in the axial direction, a support wall 15 is formed integrally with the transmission case 1, and extends inwardly in the radial direction, supporting the input shaft 100 through a bearing and rotational members. The support wall 15 divides the shifting gear chamber 12 into a front chamber 12a and a rear chamber 12b. The front chamber 12a is at a side closer to the torque converter 3 (hereinafter referred to as a front side), and a rear chamber 12b is at a side opposite to the front side (hereinafter referred to as a rear side). The first boss 16a is integrally formed with the transmission case 1 and extends toward the rear side, while the second boss 16b is integrally formed with the rear cover 6 and extends toward the front side.

Only the first planetary gear set GS1 is arranged in the front chamber 12a, while the second through fourth planetary gear sets GS2, GS3 and GS4 are arranged in the rear chamber 12b. Among the three planetary gears in the rear chamber 12b, the second planetary gear set GS2 is arranged at the end of the rear side, and the fourth planetary gear set GS4 is arranged at the end of the front side.

Referring to FIGS. 3 and 4, the first planetary gear set GS1 comprises a first sun gear S1, a first ring gear R1, and a first carrier PC1 that supports first pinions P1 engaging with both the gears S1 and R1. In other words, the first planetary gear set GS1 comprises a single set of sun gear, ring gear and pinions engaging the both, and is called a single pinion type. Also, the second planetary gear set GS2 is a single pinion type planetary gear set comprising a second sun gear S2, a second ring gear R2, and a second carrier that supports second pinions engaging with both the gears S2 and R2. Speed reduction ratios at the first and second planetary gear sets GS1 and GS2 (in other words, respective ratio of numbers of teeth between the ring gears and the pinions) are different from each other.

As shown in FIG. 3, the first sun gear S1 is permanently fixed to an outer peripheral surface of the first boss 16a by means of a spline or in the manner known in the art. Similarly, the second sun gear S2 is fixed to an inner peripheral surface of the second boss 16b by means of a spline or in the manner known in the art. On the other hand, the first ring gear R1 is permanently connected to the input shaft 100 through a first connecting member M1, which has a boss fixed to the input shaft 100 in the known manner such as by welding. Similarly, the second ring gear R2 is permanently connected to the input shaft 100 through a second connecting member M2, which has a boss fixed to the input shaft 100 in the known manner such as by spline.

Therefore, the ring gears R1 and R2 permanently rotate together with the input shaft 100, while the sun gears S1 and S2 never rotate. Thereby, the first and second planetary gear sets GS1 and GS2 permanently reduce rotational speeds of the input shaft 100, and output the reduced speeds respectively from the first and second carriers PC1 and PC2.

The third planetary gear set GS3 is a single pinion type planetary gear set comprising a third sun gear S3, a third ring gear R3, and a third carrier PC3 that supports third pinions P3 engaging with both the gears S3 and R3. Also, the fourth planetary gear set GS4 is a single pinion type planetary gear set comprising a fourth sung gear S4, a fourth ring gear R4, and a fourth carrier PC4 that supports fourth pinions R4 engaging with both the gears S4 and R4.

Then, the third ring gear R3 and the fourth carrier PC4 are permanently connected by a third connecting member M3 so that the third ring gear R3 and the fourth carrier PC4 may rotate together. Also, the third carrier PC3 and fourth ring gear R4 are (permanently) connected by means of a fourth connecting member M4 so that the third carrier PC3 and the fourth ring gear R4 may rotate together. The fourth connecting member M4 extends from the rear side of the third carrier PC3 outwardly, and then extends outside of the third ring gear R3 to the fourth ring gear R4 of the fourth planetary gear set PC4 which is arranged at the front side of the third planetary gear set PC3.

In other words, the third and fourth planetary gear set GS3 and GS4, by being connected with each other by means of the third and fourth connecting members M3 and M4, collectively create four rotational elements (the third sun gear S3, the third carrier PC3 and the fourth ring gear R4, the third ring gear R3 and the fourth carrier PC4, and the fourth sun gear S4), thereby constituting a so called Simpson type planetary gear set. This particular configuration may also be called a CR-CR connection type because of the two "Carrier-Ring" connections.

The output gear 200 is arranged at the front side of the support wall 15. A bearing 15b is inserted and fixed to a boss 15a formed at the inner periphery of the support wall 15. The bearing 15a rotationally supports the output gear 200. The output gear 200 is connected to the fourth carrier PC4 so that the output gear 200 and the fourth carrier PC4 may rotate together.

Figures 5, 6:
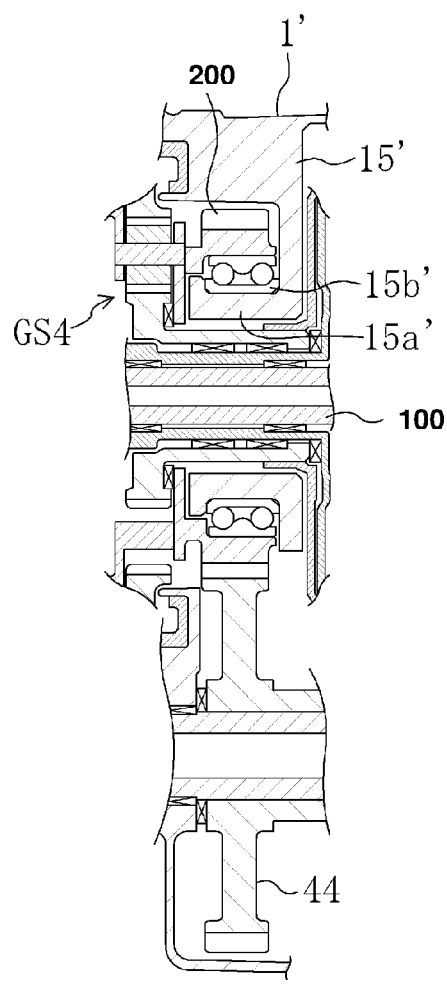
FIG. 5 is a table showing engaged frictional elements at respective speed gears.
FIG. 6 is an enlarged sectional view of an automatic transmission in accordance with another embodiment of the present description, showing a neighborhood of an output gear.

The shifting gear mechanism 2 is configured, as shown in FIG. 4, to attain six forward gears and a reverse gear by selectively engaging the five frictional elements or the three first through third clutches C1 through C3 and two first and second brakes B1 and B2, as shown in FIG. 5 (X indicates engagement of a frictional element). Although not shown, a hydraulic control circuit is connected to actuators for the first through third clutches C1 through C3 and first and second brakes B1 and B2, and selectively supplies a pressure to the actuators to engage the corresponding the frictional elements. The hydraulic control circuit may be a purely hydraulic controller, a electronic controller, a hydraulic and electronic controller, or any other appropriate controller known in the art.

Although described later in detail, in the present embodiment, a one-way clutch OWC is arranged in parallel to the second brake B2. Although normally in the first forward gear, the second brake B2 is not engaged, the second brake B2 is engaged only in a case such as a manual mode or a hold mode where engine brake is necessary (shown with a parenthesis in the engagement operational table). However, there may not be the one-way clutch OWC. In that case, the second brake B2 is engaged in the first forward gear.

The first clutch C1 engages the fourth sun gear S4 and the first carrier PC1 in the first through fourth gears as shown in the engagement operational table of FIG. 5 (hereinafter, the first clutch will be referred to as Low clutch). The Low clutch C1 is arranged at the outer periphery of the first planetary gear set GS1 in the radial direction. It comprises a clutch drum 51, whose boss is connected to the first carrier PC1 at its front side, a clutch hub 52 arranged at the radial inside of the clutch drum 51, and a plurality of frictional clutch hub plates 53 and frictional clutch drum plates 54 arranged alternately in the axial direction between the clutch drum 51 and the clutch hub 52 in the radial direction.

At radial inside of the clutch drum 51, a clutch piston 55 is arranged and defines a pressure receiving chamber with the walls of the clutch drum 51. When a hydraulic pressure is introduced into the pressure receiving chamber, the clutch piston 55 may move toward the rear side against urging force of a return spring 57, and push the fictional plates 53 and 54, which press each other and transmit torque from the clutch drum 51 to the clutch hub 52.

In the present embodiment, considering that hydraulic pressure in the pressure receiving chamber rises as it rotates due to centrifugal force, a sealing plate (balance plate) 56 is provided and defines, with the piston 55, a centrifugal balance chamber that is next to the pressure receiving chamber. Thereby, hydraulic pressures in the centrifugal balance chamber and the pressure receiving chamber may increase equally as the rotational speed increases, so that the clutch controllability can be improved.

The clutch hub 52 extends in the axial direction to the rear side at the outer periphery of a clutch drum 61 of later described High clutch C2. The rear end of the clutch hub 52 couples to a disk shaped torque transmitting member 58, which has a cylindrical boss at its inner periphery that is coupled to a fifth connecting member M5 by a spline or the like. The fifth connecting member axially extends between the input shaft 100 and the output gear 200 as seen in the radial direction, and connects to the sun gear S4 of the planetary gear set GS4. Therefore, the clutch hub 52 eventually couples to the fourth sun gear S4 through the torque transmitting member 58 and the fifth connecting member M5. So, when the Low clutch C1 is engaged, the first carrier PC1 of the first planetary gear set GS1 and the fourth sun gear S4 of the fourth planetary gear set GS4 rotate together.

The second clutch C2 engages the third carrier PC3 and the first ring gear R1 (in other words, the input shaft 100), as shown in the engagement operational table of FIG. 5, in the fourth through sixth gears (hereinafter, the second clutch will be referred to as a High clutch). The High clutch C2 is arranged at the outer periphery of the first planetary gear set GS1 in the radial direction and at the rear side of the Low clutch C1 in the axial direction. The High clutch C2 comprises a clutch drum 61, whose boss is connected to the first ring gear R1 at its rear side, a clutch hub 62 arranged at the radial inside of the clutch drum 61, a plurality of frictional clutch hub plates 63 and frictional clutch drum plates 64 arranged alternately in the axial direction between the clutch drum 61 and the clutch hub 62 in the radial direction. The clutch hub 62 has a cylindrical boss at its radial inner periphery, which axially extends to the rear side between the input shaft 100 and the output gear 200 in the radial direction, and eventually connects to the third carrier PC3. Accordingly, when the above High clutch C2 is engaged, the first ring gear R1 of the third carrier PC3 of the third planetary gear set GS3 will rotate together.

The High clutch C2 has, at its radial inside, a clutch piston 65, which defines a pressure receiving chamber with walls of the first connecting member M1 that connects the first ring gear R1 to the input shaft 100. The clutch piston 65 may move, depending on operational hydraulic pressure supplied to the pressure receiving chamber, against urging force of a return spring 67, toward the rear side (in the left direction in FIG. 3), press the clutch plates 63 and 64 to each other, and engage together the clutch drum 61 and the clutch hub 62. Considering the centrifugal force applied on the operational oil in this pressure receiving chamber as well, a sealing plate 66 is arranged to define a centrifugal balance chamber next to the pressure receiving chamber.

As described above, the two clutches C1 and C2 are housed in the front chamber 12a of the shifting gear chamber 12 of the transmission case 1. The Low clutch C1 which selectively transmits torque from the input shaft 100 to the sun gear S4 of the fourth planetary gear set is arranged at the front side of the High clutch C2 which selectively transmits torque from the input shaft 100 to the planetary carrier PC3 of the third planetary gear set GS3 and the sun gear S4 of the fourth planetary gear set PC4. The Low clutch C1 and the High clutch C2 are arranged aligned in the input shaft direction, and the clutch piston 55 of the Low clutch C1 and the clutch piston 65 of the High clutch C2 are respectively arranged at the front and rear sides of the first planetary gear set GS1 in the axial direction. Therefore, these rotational parts are housed in the front chamber 12a with higher space efficiency, and the members connecting between these rotational parts can be can be made shorter.

On the other hand, in the rear chamber 12b of the shifting gear chamber 12 of the transmission case 1, three frictional elements, i.e. the first clutch C3 and the first and second brakes B1 and B2, are housed.

The third clutch C3 may engage the second carrier PC2 and the third sun gear S3, as shown in the engagement operational table of FIG. 5, in the third gear, the fifth gear and the reverse gear (hereinafter, the third clutch will be called a 3/5/R clutch). The 3/5/R clutch C3 has a clutch drum 71 which is arranged at the outer periphery of the second planetary gear set GS2, has a boss connected to the second carrier PC2, a clutch hub 72 which is arranged at the inner peripheral side of the clutch drum 71 in the radial direction and has a boss connected to the third sun gear S3, and a plurality of frictional clutch hub plates 73 and frictional clutch drum plates 74 arranged alternately in the axial direction between the clutch drum 51 and the clutch hub 52 in the radial direction. Accordingly, when the 3/5/R clutch is engaged, the second carrier PC2 of the second planetary gear set GS2 and the third sun gear S3 of the third planetary gear set GS3 will rotate together.

The 3/5/R clutch C3 has, at its radial inside, a clutch piston 75, which defines a pressure receiving chamber with walls of the clutch drum 71. The clutch piston 75 may move, depending on operational hydraulic pressure supplied to the pressure receiving chamber, against urging force of a return spring 77, toward the front side (in the left direction in FIG. 3), press the clutch plates 73 and 74 to each other, and engage together the clutch drum 71 and the clutch hub 72. Considering the centrifugal force applied on the operational oil in this pressure receiving chamber as well, a sealing plate 76 is arranged to define a centrifugal balance chamber with the clutch piston 75.

The first brake B1 engages the third sun gear S3 to the transmission case 1, and stops the rotation of the third sun gear S3, as shown in the engagement operational table of FIG. 5, in the second and sixth gears (hereinafter, the first brake will be referred to as a 2/6 brake). The 2/6 brake B1 has a brake hub 82 that is arranged at between the 3/5/R clutch C3 and the transmission case 1 in the radial direction, and has a boss connected to the clutch hub 72 of the 3/5/R clutch C3, and a plurality of frictional brake hub plates 83 and frictional brake case plates 84 arranged alternately in the axial direction between the inner surface of the transmission case and the brake hub 82 in the radial direction. Since the brake hub 82 connects to the clutch hub 72 of the 3/5/R clutch C3, the brake hub 82 eventually connects to the third sun gear S3. Accordingly, the 2/6 brake B1 is engaged, the sun gear S3 of the third planetary gear set GS3 does not rotate.

A brake piston 85 is inserted into a concave formed in the rear cover 6 of the transmission case 1, and defines a pressure receiving chamber with that concave. The brake piston 85 may move, depending on a hydraulic pressure supplied to the pressure receiving chamber, against urging force of a return spring 87, toward the front side (in the right direction in FIG. 3), press the brake plates 83 and 84 to each other, and engage together the brake hub 82 and the transmission case 1.

The brake piston 85 of the 2/6 brake B1 is arranged at the outer side of the clutch piston 75 of the 3/5/R clutch C3 in the radial direction, and the both pistons 75 and 85 are overlapped with each other in the axial direction. Therefore, the both pistons 75 and 85 can be arranged closer to the torque converter 3 in the axial direction, and the overall length of the automatic transmission AT can be made shorter.

The second brake B2 engages the fourth connecting member M4, which connects the third carrier PC3 and the fourth ring gear R4, to the transmission case 1, and selectively stops the rotation of the fourth connecting member M4 and the fourth ring gear R4, as shown in the engagement operational table of FIG. 5, in the first and reverse gears (hereafter, the second brake B2 will be called a L/R brake). As described above, the L/R brake B2 is engaged in the first gear only when engine brake is needed, such as in a manual mode, a hold mode, or the like.

The L/R brake B2 is arranged at the front side of the 2/6 brake B1, and an outer side of the third and fourth planetary gear sets GS3 and GS4. The fourth connecting member M4 constitutes a brake hub of the L/R brake B2. A plurality of frictional brake hub plate 93 and frictional brake case plate 94 are arranged alternately in the axial direction and between the fourth connecting member M4 and the transmission case in the radial direction. Accordingly, when the L/R brake B2 is engaged, the third carrier PC3 of the third planetary gear set GS3 and the ring gear R4 of the fourth planetary gear set GS4 do not rotate.

A brake piston 95 is inserted into a concave formed in the support wall 15 at its rear side to define a pressure receiving chamber. The brake piston 95 may move, depending on a hydraulic pressure supplied to the pressure receiving chamber, against urging force of a return spring 97, toward the rear side (left side of FIG. 3), press the brake plates 93 and 94 to each other, and engage together the fourth connecting member M4 and the transmission case 1.

The return spring 97 is arranged in a concave groove 17 formed at the inner surface of the transmission case 1, and thereby the return spring 97 is positioned at an outer radial side of the brake plates 93 and 94.

At the rear side of the L/R brake B2, a one-way clutch OWC is arranged between the transmission case 1 and the fourth connecting member M4. The one-way clutch OWC prevents the fourth connecting member M4 from rotating in one direction.

The one way clutch OWC is supported by a support member 18 that is attached and fixed to the inner surface of the transmission case 1. The support member 18 also functions as a receiver for the spring force of the return spring 97 of the L/R brake B2, and as a retainer plate to for receiving the pressing force of the brake plates 93 and 94 caused by the brake piston 95.

The automatic transmission AT of the present embodiment has the first through fourth planetary gear sets GS1 through GS4 of the single pinion type, and configured to selectively activate the three first through third clutches C1 through C3 and two first and second brakes B1 and B2 to attain six forward gears and a reverse gear. In other words, the automatic transmission AT does not include a compound type planetary gear set such as the Ravigneaux type, does not need a planetary gear set of the double sun gear type or double ring gear type, and further needs only small number, actually five or less, of frictional elements that engage rotational elements with each other, for which, it is advantageous in reduction of cost and weight, reduction of noise or vibration.

As described above, the first and second planetary gear sets GS1 and GS2 permanently reduce the speed of the input shaft 100, and torque from the input shaft is permanently input to the planetary gear sets GS1 and GS2 through no releasable frictional elements and multiplied there. Therefore, torque load there is a minimum because the planetary gear sets GS1 and GS2 perform a first stage of multiple torque multiplication stages, and torque fluctuation there is a minimum because of the permanent torque transmission. Consequently, the first and second planetary gear set can have a smaller size. Thereby, the Low and High clutches C1 and C2 can be arranged at the outer side of and partly overlapped with the first planetary gear set GS1 in the axial direction, and the 3/5/R clutch C3 and the 2/6 brake B1 can be arranged at the outer side of and overlapped with the second planetary gear set GS2.

Further, by arranging the first planetary gear set GS1 at the front side, the second permanent reduction gear set GS2 at the rear side, the Simpson type planetary gear set consisting of the relatively larger two sets of third and fourth planetary gear sets GS3 and GS4 between the first and second planetary gear sets GS1 and GS2, and the output gear 200 that is connected to the fourth carrier PC4 between the Simpson type planetary gear set and the first planetary gear set GS1, the connecting members and the like M1 through M5, 51, 52, 58, 61, 62, 71, 72 and 82 can be made shorter, and the automatic transmission AT can be made smaller.

Also, by arranging the Low and High clutches C1 and C2 at the outer side of the first planetary gear set GS1, the overall length of the transmission can be made shorter to construct it compact, as well as to make it further appropriate for mounting on front wheel drive vehicles. At this time, since the first planetary gear set GS1 is made compact, the automatic transmission AT is prevented from being larger in the radial direction even when the clutches C1 and C2 are arranged at the outer side of the first planetary gear set GS1.

The 2/6 brake B1 and the L/R brake B2, which are relatively large in diameter especially from a viewpoint of securing brake capacity, are housed in the rear chamber 12b. Only the clutches (Low and High clutches C1 and C2), which do not need so large diameter, are housed in the front chamber 12a, in which the first planetary gear set GS1 is housed, and arranged side by side in the axial direction. Therefore, the final gear 45 can be arranged overlapped with the two clutches C1 and C2 in the axial direction, and eventually the differential gear mechanism 4 can be too. Consequently, the differential gear mechanism 4 can be arranged closer to the torque converter 3 or the vehicle center line.

Further by arranging the first planetary gear set GS1 in the substantially middle position in the axial direction in the front chamber and the clutch pistons 55 and 65 of the Low and High clutches C1 and C2 in spaces of the both sides of the first planetary gear set GS1 in the axial direction, the first planetary gear set GS1 and the Low and High clutches C1 and C2 can be arranged with great space efficiency.

Additionally by arranging the Low clutch C1 that is connected to the output of the first planetary gear set GS1 at its the front side, and the High clutch C2 that is connected to the input of the first planetary gear set GS1 at its rear side, the members 51, 52, 58, 61 and 62 that make input/output with the Low and High clutches C1 and C2 can be arranged in shorter length, and then in thickness, so the automatic transmission AT can be made smaller.

Since the front chamber 12a can be made smaller in the radial direction as described above, the differential gear mechanism 4 can be closer to the front chamber 12a in the vehicle longitudinal direction (see FIG. 2), and the overall transaxle TX including the differential gear mechanism 4 can be smaller, and the differential gear mechanism 4 can be arranged closer to the vehicle center line (see FIG. 1). This is advantageous on that the both drive shafts 42 make their folding angles to be moderate when the front wheels are steered. Also, the ring gear 41 of the differential gear mechanism 4 can be made greater in diameter, and it will be preferable on that the design freedom of speed reduction ratio is increased without decreasing compactness.

By arranging 3/5/R clutch C3 and the 2/6 brake B1 at the outer side of the second planetary gear set GS2 in the radial direction and overlapped in the axial direction, these parts can be housed in smaller space in the axial and radial directions because the second planetary gear set GS2 is made smaller as described above. Therefore, the rear cover 6, the transmission case 1 or the like can be made smaller while their rigidity can be maintained.

Further, since the output gear 100 is arranged at the rear side of the first planetary gear set GS1, the driven gear 44 of relatively greater diameter can be arranged offset from the first planetary gear set GS1 in the vehicle width direction, and the counter shaft 43 can be arranged closer to the shifting gear mechanism 2 in the generally vertical direction (see FIG. 2). In other words, the transaxle TX can be made smaller in the vertical direction. And, since the length of the counter shaft 43 can be made shorter by arranging the driven gear 44 closer to the final gear 45, the transaxle can be made smaller in the vehicle width direction without causing unnecessary mechanical loss or weight increase (see FIG. 1).

In the above embodiment, the output gear 100 is rotationally supported by means of the bearing 15b inserted into the boss 15a of the support wall 15, arranged at the front side of the support wall 15, and housed in the front chamber 12a. Therefore, the driven gear 44 can be arranged closer to the torque converter in the axial direction, and eventually the counter shaft 43 can be made shorter.

Alternatively, as shown in FIG. 6, a bearing 15b' may be outfit on the boss 15a' of the support wall 15', and the output gear 200 may be supported by means of the bearing 15b', and housed in a concave groove formed in the support wall 15' at its rear side. In this construction, the output gear 200 is not required to pass through the support wall 15' to connect to the planetary carrier PC4 of the fourth planetary gear set GS4, and the input shaft 100 can be made shorter.

It is needless to say that the invention is not limited to the illustrated embodiments and that various improvements and alternative designs are possible without departing from the substance of the invention as claimed in the attached claims. For example, the transaxle TX may be mounted on rear wheel drive vehicles.

The invention claimed is:

1. An automatic transmission, comprising:
   an input shaft capable of receiving torque from an engine;
   a transmission case rotationally supporting said input shaft;
   first and second planetary gear sets arranged coaxially on said input shaft, each having a single sun gear and a single ring gear, one of which permanently rotates together with said input shaft, and the other of which is fixed to said transmission case;
   a gear mechanism arranged coaxially on said input shaft between said first and second planetary gear set, and capable of receiving torque selectively through said first or second planetary gear set; and
   an output gear arranged coaxially on said input shaft between said first planetary gear set and said gear mechanism and capable of outputting torque from said gear mechanism.

2. An automatic transmission, comprising:
   an input shaft capable of receiving torque from an engine;
   a transmission case rotationally supporting said input shaft;
   first and second planetary gear sets arranged coaxially on said input shaft, each having a single sun gear that is fixed to said transmission case and a single ring gear that rotates together with said input shaft;
   a gear mechanism arranged coaxially on said input shaft between said first and second planetary gear sets, and capable of receiving torque selectively through said first or second planetary gear set; and
   an output gear arranged coaxially on said input shaft between said first planetary gear set and said gear mechanism and capable of outputting torque from said gear mechanism.

3. The automatic transmission as described in claim 2, wherein said gear mechanism comprises a third planetary gear set having a single sun gear and a single ring gear, and a fourth planetary gear set having a single sun gear and a single ring gear, some of rotational elements of said third and fourth planetary gear set being permanently connected with each other, and one of said rotational elements of said fourth planetary gear set being coupled to said output gear.

4. The automatic transmission as described in claim 2, further comprising:
   a second shaft arranged in parallel to said input shaft; and
   a driven gear coaxially arranged on said second shaft and engaging with said output gear.

5. The automatic transmission as described in claim 4, further comprising a final gear rotationally arranged on said second shaft and capable of transmitting torque from said driven gear to a vehicle driving wheel.

6. The automatic transmission as described in claim 5, wherein said final gear is at least partially overlapped with said first planetary gear set in the axial direction.

7. The automatic transmission as described in claim 6, further comprising a torque converter capable of transmitting torque from said engine to said input shaft, and wherein said first planetary gear set is arranged between said output gear and said torque converter.

8. The automatic transmission as described in claim 2, further comprising a torque converter arranged coaxially with said input shaft and capable of transmitting torque from said engine to said input shaft, and wherein said first planetary gear set is arranged closest to said torque converter in the axial direction among said planetary gear sets.

9. The automatic transmission as described in claim 8, wherein the gear mechanism comprises third and fourth planetary gear sets arranged between said first and second planetary gear sets, and said output gear is arranged between said first and fourth planetary gear sets.

10. The automatic transmission as described in claim 9, wherein said output gear is connected to one of a plurality of rotational elements of said fourth planetary gear set.

11. The automatic transmission as described in claim 10, wherein said output gear is connected to a planetary carrier of said fourth planetary gear set through a first connecting member.

12. The automatic transmission as described in claim 11, wherein one of a plurality of rotational elements of said first planetary gear set is capable of transmitting torque to a sun gear of said fourth planetary gear set through a second connecting member.

13. The automatic transmission as described in claim 12, wherein another one of a plurality of rotational elements of said first planetary gear set is capable of transmitting torque to said third planetary gear sets through a third connecting member.

14. The automatic transmission as described in claim 13, further comprising a support wall formed integrally with said transmission case, and rotationally supporting coaxially said input shaft and said first through third connecting members.

15. The automatic transmission as described in claim 10, wherein at least one of the rotational elements of said third planetary gear set is connected to one of the rotational elements of said fourth planetary gear set.

16. The automatic transmission as described in claim 8, wherein torque from said input shaft is permanently transmitted to ring gears of said first and second planetary gear sets.

17. The automatic transmission as described in claim 16, wherein the gear mechanism comprises third and fourth planetary gear sets arranged between said first and second planetary gear sets, said fourth planetary gear set being closer to said torque converter than said third planetary gear set in the axial direction, said first planetary gear set is capable of transmitting torque to said fourth planetary gear set, and said second planetary gear set is capable of transmitting torque to said third planetary gear set.

18. An automatic transmission, comprising:
   an input shaft capable of receiving torque from an engine;
   a transmission case rotationally supporting said input shaft;
   first and second planetary gear sets arranged coaxially on said input shaft, each having a single sun gear that is fixed to said transmission case and a single ring gear that rotates together with said input shaft;
   a gear mechanism capable of receiving torque selectively through said first or second planetary gear sets, wherein the gear mechanism includes two single pinion planetary gear sets; and
   an output gear arranged coaxially on said input shaft between said first planetary gear set and said gear mechanism and capable of outputting torque from said gear mechanism.

* * * * *